United States Patent [19]

Hajou et al.

[11] Patent Number: 4,973,237

[45] Date of Patent: Nov. 27, 1990

[54] APPARATUS FOR THE PRODUCTION OF GRAINS ACCORDING TO THE ROLLING LAYER TECHNIQUE

[75] Inventors: Rudolf Hajou; Ernö Horváth; Zoltán Ormós; Károly Pataki; András Szalay, all of Veszprém, Hungary

[73] Assignee: Magyar Tudomanyos Akademia Muszaki Kemiai Kutato Intezet, Veszprem, Hungary

[21] Appl. No.: 362,508

[22] Filed: Jun. 7, 1989

[30] Foreign Application Priority Data

Jun. 8, 1988 [HU] Hungary .............................. 22512958

[51] Int. Cl.$^5$ ............................. B01J 2/12; B01J 2/14; B29B 9/08; B29C 67/02
[52] U.S. Cl. ........................................ 425/92; 366/93; 425/222
[58] Field of Search ................... 118/19; 425/222, 204, 425/213, 219, 258, 270, 92; 366/93, 165, 187, 182, 54

[56] References Cited

U.S. PATENT DOCUMENTS

| | | | |
|---|---|---|---|
| 2,876,491 | 3/1959 | Meyer | 425/222 |
| 2,938,674 | 5/1960 | Lee | 366/187 |
| 3,748,249 | 7/1973 | Barton | 118/19 |
| 3,796,412 | 3/1974 | Maurer | 118/19 |
| 3,834,347 | 9/1974 | Motoyama et al. | 118/19 |
| 4,041,648 | 8/1977 | Heiberger | 366/187 |
| 4,255,253 | 3/1981 | Herrington et al. | 208/216 PP |

Primary Examiner—Willard Hoag

[57] ABSTRACT

An apparatus for the production of grains using the rolling layer technique. The apparatus has a container formed from multiple concentric sections, a truncated cone shaped lower section, a cylindrical shaped middle section, and, at least one cylindrical shaped upper section, and is supported for rotation about the longitudinal axis of the container. The lower section tapers outward from a lower end face plate to an upper end which communicates with the lower end of the middle section to form a transfer port between the lower and middle sections, while the upper end of the middle section communicates with the holed lower face of the upper section to form a transport port between the upper and the middle sections. An annular ridge-like structure exists on the interior surface of the lower face of the upper section, circumferentially surrounding the transfer port. The cross-sectional diameters and the heights of the sections vary relative to each other. The grain forming components in solid or liquid form are supplied by inlet devices to the different sections to produce grains as the apparatus is selectively rotated about its longitudinal axis at a predetermined angle above the horizontal.

20 Claims, 2 Drawing Sheets

APPARATUS FOR THE PRODUCTION OF GRAINS ACCORDING TO THE ROLLING LAYER TECHNIQUE

BACKGROUND OF THE INVENTION

1. Field of the Invention

The invention relates to an apparatus for the production of grains according to the rolling layer technique.

2. Description of Related Art

In various technical fields, e.g. in the chemical, pharmaceutical, and food industries as well as in agriculture, the production of spherical or approximately spherical grains of 1-10 mm size is often a necessity. The effort directed to the production of material available in this form, —in addition to the special advantages in the existing particular field and the aesthetic appearance of the product—has the following important general reasons: good abrasive resistance; high breaking strength; adjustable and easy feeding (smooth flow); homogeneous (quasi-homogeneous) space utilization; minimal grain surface and volume ratio, and beneficial hydrodynamic characteristics. One of the possible methods for producing sets of grains having such properties is the rolling layer technique known in several versions.

Rolling layer is understood as a special motion-form of a set of grains which facilitates execution of physical, physiochemical and chemical processes, in the course of which in the interior of an axially symmetrical apparatus-body—as a result of the total effect of friction, gravitation and centrifugal forces—the whole set, and within it, each grain performs a characteristic rolling-rotary motion. This motion basically depends on the speed (r.p.m.) of the apparatus body. The mentioned physical process may be for example grinding, granulation, application of a coating layer; physiochemical process is for example the calcination and chemical process is the ammoniation.

The devices—apparatuses—of the rolling layer technique are known in several forms and sizes; these apparatuses are mostly called "rotary vessel", "drum" or "plate" (P.J. Sherrington, R. Oliver: "Granulation", Heyden and Son Ltd. 1981; K. Meyer: "Pelletizing of Iron Ores", Springer Verlag, Berlin, 1980).

If the work involves size-increasing and forming sets of grains or powders, then basically the following processes take place in the rolling layer: nucleation (agglomeration of primary grains); fusion (coalescence of agglomerates), and surface layering (sticking of primary grains on the surface of nuclei or larger agglomerates) (C.E. Capes: "Particle size enlargement", Elsevier Scientific Publishing Co., 1980).

It is evident, that if the enumerated basic processes (furthermore the additional stochastic processes not detailed here) could take place jointly in time and/or space, then the derived product—regarding the grain size distribution—would be heterogenerous and the individual grains would not be spherical by necessity. On the other hand, the condition of producing virtually spherical grains of nearly the same size is that the grains should be growing mainly according to the mechanism of ideal layering, i.e. at the same rate on all points of the grains—and the agglomeration should take place separately in space and/or time, at an optionally controlled rate, mainly limited to the possible necessary nucleation. But the possibility of agglomeration, e.g. coalescence of the grains close to the required size of the product should be definitely precluded.

With the apparatuses based on the currently known rolling layer technique, the mentioned conditions cannot be fully satisfied, consequently a product of suitable quality—virtually regular spherical sets of grains having 1-10 mm grain size, powder-free surface, good mechanical characteristics, and regarding the average grain size, a relative grain distribution of a maximum 0.2—cannot be ensured in continuous and stationary operation. A product with such parameters can be produced only in an intermittent operating mode, so that the formation takes place mostly with a so-called size enlarging-forming coating.

The essence of this method is to bring the grains—nuclei—smaller than the required size to a rolling motion in a rotary vessel or drum, then the surfaces are uniformly wetted with automization of liquid until the limit of adhesion. This is followed by applying uniformly coating powder to the rolling layer—e.g. through a vibration sieve—until the powder is set on the surface of the grains. The wetting and powdering are repeated until the required size and shape are reached. If necessary, the wet grains are compacted by after-rolling. The nuclei can be formed in a separate step from the powder with a granulation process, but occasionally foreign nuclei are also used; e.g. when coating vegetable seeds, the nucleus is already given.

Catalysers and catalyser-carriers can also be formed with the method similar to the one used for coating of vegetable seeds. Such solutions were disclosed in the European patent specification No. 75,314 and U.S. Pat. No. 4,255,253. Similarly, the formation of adsorbents can also be accomplished.

The common drawback of all the presently known intermittent grain-forming processes based on size-enlargement coating is the low productivity and very high labour demand.

SUMMARY OF THE INVENTION

A purpose of the invention is to provide a continuously operating, stationary apparatus which utilizes rolling layer technology, whereby spherical or nearly spherical, 1-10 mm diameter grains of powder-free surface can be economically produced with high productivity, the quality of which is the same as that of the product known for its friability and breaking strength made with intermittently operating, size enlargement coating methods.

The invention is based on the recognition, that if the size enlargement surface layering is made dominant and adjustable as well as if the number of grains is kept at nearly constant value in time, the set of grains composed by nearly spherical grains of powder-free surface, 1-10 mm diameter, narrow size distribution, and good mechanical properties, can be produced economically and with high productivity. Further, the invention is based on the recognition that making the size enlargement surface layering predominant and adjustable can be accomplished by increasing the segregation according to the size and shape of the grains, reducing the rate of back-mixing, dividing the flow of solid matter(s) to be processed and that of the granulating liquid(s) and their inlet to different points.

On the basis of these recognitions, the problem was solved according to the invention with an apparatus provided with a rotatable space element suitable for receiving the grain-forming components, and the apparatus is characterized by a cylindrical second space element open on both sides adjoining the truncated cone-shaped first space element provided with bottom plate on its side of the smaller diameter, the maximum diameter of which equals the diameter of the second space element, so that a transfer port of such diameter is between these two space elements; the second space element is connected with a further cylindrical third space element similarly open on both sides, the diameter of which is greater than that of the second space element, and a transfer port with diameter equal to the former one's is between the second and third space elements; the three space elements are concentrically arranged in relation to the geometrical axis of rotation, the part of the third space element overhanging the second space element in a circle is closed with a circular bottom plate, and an annular blocking piece surrounding the transfer port between the second and third space elements runs around the inside flange of the bottom plate and upper flange of the second space element's cylindrical side-wall, the height of which is lower than that of the third space element.

With the aid of the above-described apparatus, parts of the rolling layer grain formation process were separated in space, and inlet of the quantitatively and/or qualitatively different solid matter and liquid flows into the space parts performing various functions is instrumental in limiting the agglomeration exclusively to formation of the necessary amount of nuclei. Thus, the shape and size of the grains are determined decisively by the buildup as a result of surface layering. The flow(s) of solid matter is/are dry and/or powders prewetted to different degree; from these materials formed or foreign nuclei, or their mixture can be obtained. The liquid flows—which in dissolved and/or suspended state may contain certain components, e.g. binding—film-forming—and colouring materials—are injected in dispersed form through atomizers, but their quantity and drop size distribution—as necessary according to the existing purpose—depend on the location of the given atomizer and part-process (nucleation, surface layering or compacting after-rolling) characteristic to that location.

It is characteristic of a preferred embodiment of the apparatus, that—regarding the radial section of the annular blocking piece—its surface is concave on the side facing the transfer port, and convex on the opposite side, furthermore it is rounded in the vicinity of its top. According to another example, the cross section of the blocking piece is a triangle, one vertex of which runs along the transfer port's flange, but it is conceivable that the cross section of the blocking piece is hemisphere or spherical segment.

Regardless of the other dimensions of the apparatus, the maximum height of the blocking piece is 1-10 cm, preferably 2-5 cm.

Generally the angle of the apparatus's geometrical axis of rotation to the horizontal is 0°-50°, suitably 20°-40°.

According to another preferred criterion of the invention, the minimum diameter of the first space element is 0.1-0.6 m, preferably about 0.3 times the diameter of the second space element; and diameter of the third space element is 1.2-2 times, preferably about 1.4-1.5 times the diameter of the second space element. Furthermore it may be practical, if height of the first and second space element is 0.1-0.3 m preferably about 0.2 times the diameter of the second space element; and height of the third space element is 0.1-0.3 m, preferably about 0.2 times its own diameter.

Generally the half angular subtense of the first space element is between 45° and 70°, preferably about 60°.

A further embodiment of the apparatus is characterized by one or several further cylindrical space element(s) connected with the third space element, the diameter of which is greater than that of the former space element(s), and annular blocking piece(s) surrounding the transfer port(s) is/are in the connection vicinity of the adjacent space elements. This way, the apparatus can be enlarged virtually at will.

According to another criterion of the invention, the apparatus is provided with liquid inlet sprayheads of variable position, separately leading to the space elements, and devices suitable for the inlet of various granular and/or powdery solid matter components. In this case, it is practical if the devices used for inlet of the solid matter components are connected with tanks.

BRIEF DESCRIPTION OF THE DRAWINGS

The invention is described in detail with the aid of enclosed drawings showing a preferred embodiment of the apparatus by way of examples, and some of its structural details, in which.

DETAILED DESCRIPTION OF THE INVENTION

Figure 1:
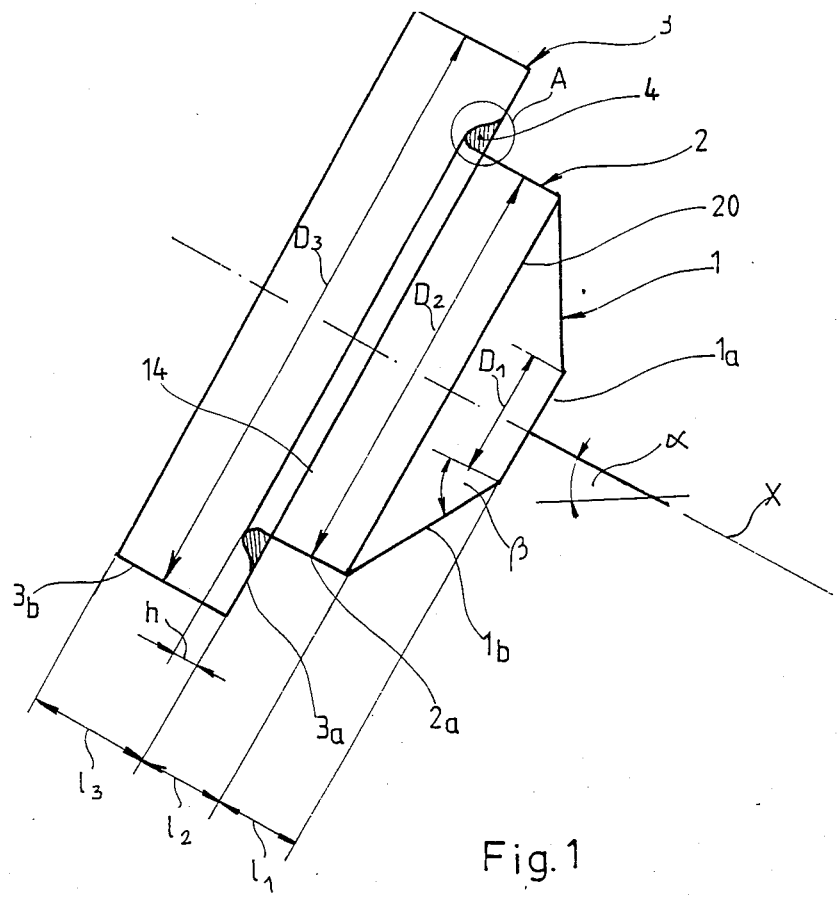
FIG. 1 is a schematic vertical section of the apparatus.

As seen in FIG. 1, the apparatus is provided with a truncated cone-shaped first space element 1 widening toward the second cylindrical space element 2, and its shorter diameter $D_1$ side is closed with bottom plate 1a. The angle of bend (half angular subtense) of the tapered side wall 1b constituents is marked with $\beta$, and height of the first space element 1 is marked with $l_1$.

The first space element 1 adjoins the cylindrical second space element 2 with its end, the diameter $D_2$ of which is greater than $D_1$. Diameter of the second space element 2 is $D_2$, its height is $l_2$ and it is open on both sides. The cross section of the transfer port 20 between space elements 1 and 2 is marked with $D_2$.

Space element 2 is connected with a third cylindrical space element 3, the diameter $D_3$ of which is greater than the diameter $D_2$ of the second space element. The space elements 1-3 are concentric and their common geometrical axis of rotation X is at an angle $\alpha$ to the horizontal. The circular transfer port of diameter $D_2$ between space elements 3 and 2 is marked with reference number 14. The space element 3 has an annular bottom plate 3a starting out of the outer flange of the cylindrical wall 2a of space element 2, and the plane of bottom plate 3a is perpendicular to the geometrical axis of rotation X. In this example, the cylindrical space element 3 at the end, on the side opposite the bottom plate 3a, is fully open. The height of the cylindrical wall 3b of space element 3 is marked with reference letter $l_3$.

The transfer port 14 is surrounded by an annular blocking piece 4, of height h, positioned on bottom plate 3a to prevent back-mixing. The height h is significantly less than the height l₃ of space element 3.

Figure 2:
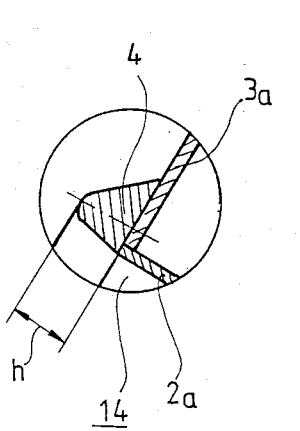
FIGS. 2-4 are various embodiments of detail A marked in FIG. 1 drawn to a larger scale.
Figure 3:
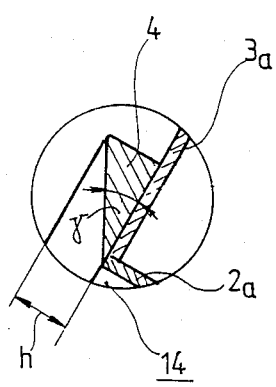
Figure 4:
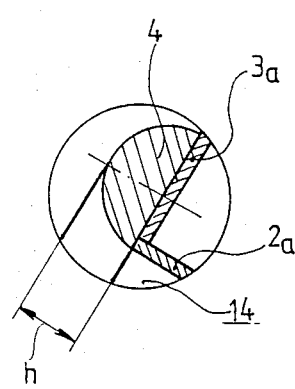

Blocking piece 4 may have various cross-sectional forms; three possible solutions are shown in FIGS. 2–4. The blocking piece 4 in FIG. 2 has a curved surface slightly outward sloping from the transfer port 14, its tip is rounded, running backwards with a gently curving slope to the bottom plate 3a. Cross section of the blocking piece 4 in FIG. 3 is a rectangular triangle, one of the vertices of the triangle at the acute angle suitably less than 45°, starts out from the junction of side wall 2a and bottom plate 3, and its shorter right angle side is perpendicular to the bottom plate 3a: Finally in FIG. 4, a hemisphere cross sectional blocking piece 4 is used, the flat surface of which seats on bottom plate 3a.

Among the geometrical characteristics shown in FIGS. 1–4, diameter $D_2$ is the most important to increase the production capacity and size, which may vary within wide —0.3–6.0 m—limits. The other dimensions depend mainly on the diameter $D_2$ according to the following relationships:

| | | | |
|---|---|---|---|
| $D_1$ = (0.1–0.6) $D_2$; | suitably | 0.3 $D_2$ |
| $D_3$ = (1.2–2) $D_2$; | " | (1.4–1.5) $D_2$ |
| $l_1$ = (0.1–0.3) $D_2$; | " | 0.2 $D_2$ |
| $l_2$ = (0.1–0.3) $D_2$; | " | 0.2 $D_2$ |
| $l_3$ = (0.1–0.3) $D_3$; | " | 0.2 $D_3$ |
| $\beta$ = 45–70 °; | " | 60° |

Height h of the blocking piece 4—independently from the other dimensions—may be between 1 and 10 cm, preferably about 2 to 5 cm.

In case of certain grain formation jobs (e.g. production of large and/or multi-layered coatings) it could be necessary to enlarge the apparatus according to FIG. 1 with further cylindrical space elements. Their diameter moving outwards should increase, and an annular blocking piece 4 inhibiting back-mixing should run between the adjacent space elements.

Figure 5:
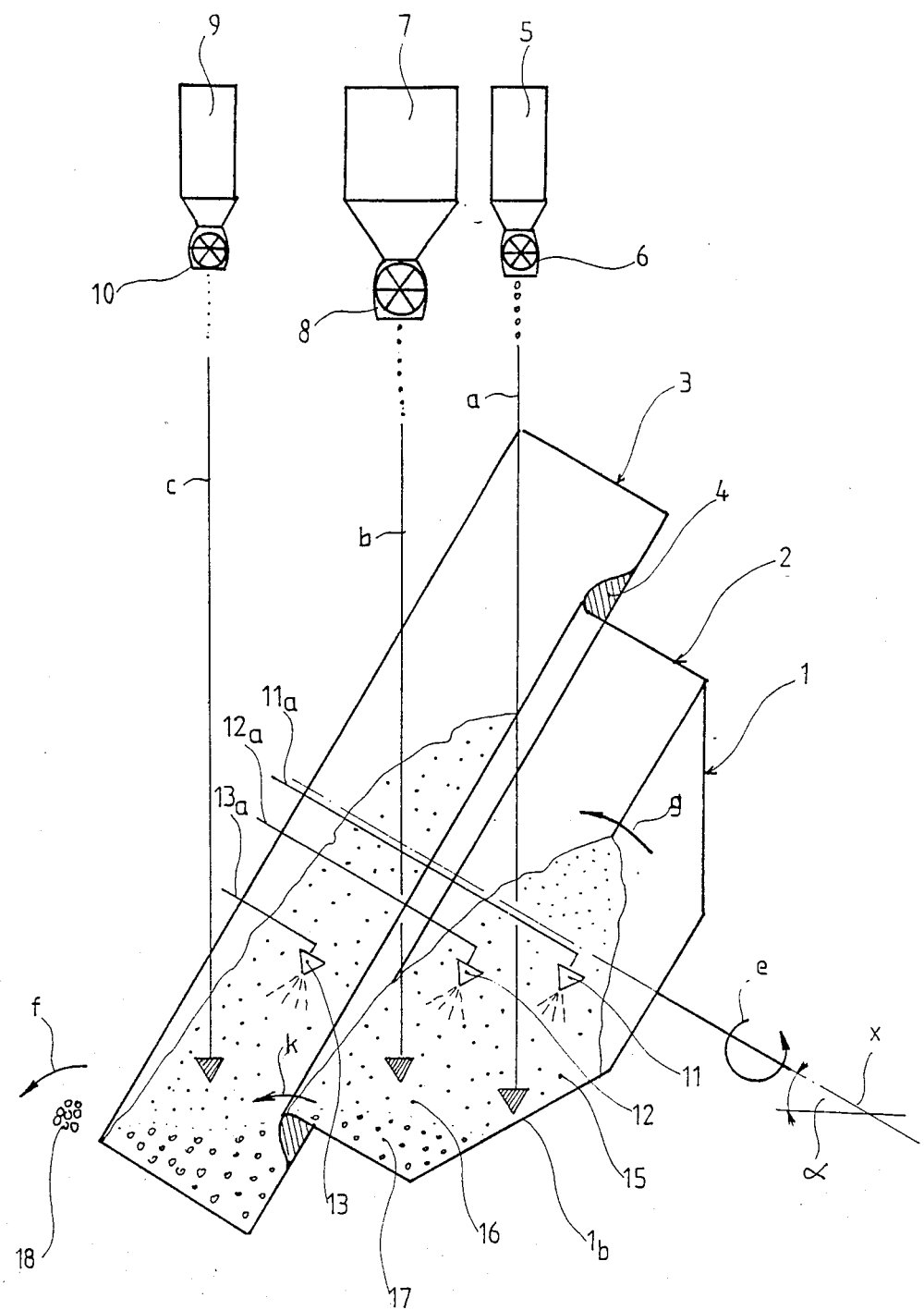
FIG. 5 is the apparatus shown in FIG. 1 drawn to a larger scale, partly with cut-off side walls during operation: in addition, the solid matter and liquid supplying devices necessary for operation of the apparatus are also shown.

Operation of the apparatus is shown in FIG. 5, using the same reference numbers as in FIGS. 1–4. The tanks 5, 7 and 9 required for operation of the apparatus are also shown in FIG. 5, and are fitted with feeding devices 6, 8 and 10. Also shown are atomizers 11, 12 and 13 with lines 11a, 12a and 13a.

The set of spherical (virtually spherical) and minimally size distributed grains is produced continuously and in stationary operation with the apparatus according to FIG. 5., by way of the size enlargment coating of the nucleus.

Around the geometrical axis of rotation X at an angle (acute angle) α to the horizontal, in the apparatus rotated at a speed lower than the critical speed in direction e, in addition to the radial grain-mixing generally characteristic to the rolling layers, and outwards tending (arrow g) grain flow, a definite grain sorting according to size and shape take place. Furthermore, the blocking piece 4 (inhibiting back-mixing of the grains opposite the arrow k) divides the rolling layer into two parts.

The mentioned "critical speed" is understood as the speed at which the grains—under the effect of centrifugal force—remain pressed to the inner face of the cylindrical walls of the apparatus, and do not roll back when moving upwards. The critical speed can be expressed with the formula:

$$n = c \cdot \sqrt{\frac{\cos \alpha}{D}},$$

where c=constant.

The grains representing the nuclei of the endproduct—set of grains—(the size of which may vary generally between 0.4 and a few mm) are fed with feeder 6 from tank 5 to the place—marked with arrow (a)—of the truncated cone shaped first space element 1, that is to the lower range of the space element 1 in the vicinity of the tapered side-wall 1b. The surface of the grains—nuclei—is continuously wetted by the atomizer 11 as to make the nuclei suitable for taking up the powder (i.e. adhesion of the powder to the surface) without agglomeration. This can be accomplished by selecting the flow ratio of solid matter and liquid, as well as the drop size distribution of the atomizer 11 according to the existing quality of material.

Continuously and uniformly distributed coating powder 16 (e.g. through vibration sieve) is fed with feeder 8 from tank 7 to the place—marked with arrow b—of the cyclindrical second space element 2,—i.e. to the lower range —, and dispersed liquid is injected with atomizer 12. Under the effect of continuous wetting and powder input, the grains performing rolling motion will grow with uniform surface layering, and their shape will approach more and more the ideal sphere. This change of the size and shape entails reduction of the dynamic slope of the set of grains. In the rolling layer apparatuses this generally leads to a certain grain sorting, considerably intensified by the specific geometric shape of the apparatus according to the invention. Thus, the grains of most regular shape and max. size accumulate in the space element 2 at the annular blocking piece 4 inhibiting the back-mixing, and the grain rolling over it at a continuous rate (arrow k) pass into the third cylindrical space element 3.

Because of the increased peripheral speed, the compacting after-rolling function of ther cylindrical space element 3 of greater diameter than the previous one's is more efficient and more advantageous than that of the space element 2, and this function is made even more efficient by the finely dispered liquid injected by atomizer 13, so that it fixes the free powder on the grain surface, and the finished product is wetted. The finished product 18 (balls) leave the space element 3 continuously by spontaneous overflow in direction f.

Naturally, also powder can be delivered from the powder tank 9 into space element 3 as indicated by arrow c, with the aid of feeder 10; this powder may be biologically or catalytically active material, pigmented powder, etc.

The tanks 5, 7 and 9 may contain solid granular materials or mixture of materials with different physical and chemical properties. The liquids (e.g. solutions, suspension, emulsions, or fusions) injected through atomizers 11, 12 and 13 (and possibly further, not illustrated atomizers) may contain various components (binding materials, active ingredients, film-forming materials etc.).

The feeders 6, 8 and 10 may be cellular, worm or vibrating mechanisms, and for the atomizer 11–13 either mono-or bifluid atomizers can be used. The apparatus may have occasionally static or mobile scraper elements to keep the inner wall clean.

The application potentials of the apparatus are demonstrated by way of examples, as follows:

The geometric data of an apparatus according to FIG. 1 are the following: $D_2=0.35$ m; $D_3=0.5$ m; $D_1=0.1$ m; $l_1=0.07$ m; $l_2=0.07$ m; $l_3=0.1$ m; $\beta=60°$; $\alpha=30°$; h = 2 cm. In this apparatus spherical 2-3 mm adsorbent grains suitable for fixing steam are produced in continuous and stationary operation from the mixture of powder containing 20 mass% bentonite and 80 mass% Na-A zeolite, so that the powdery mixture is layered on $Al_2O_3$ nuclei of 0.8 mm average grain size under continuous wetting with water. The apparatus is rotated at a speed of 35 rpm⁻. A total of 51 parts of zeolite/bentonite powder mixture arriving from tank 5 are applied to one part of $Al_2O_3$ carrier nuclei. During this procedure, $Al_2O_3$ nuclei are fed into the space element 1 to the spot marked with arrow a, at 0.19 kg/h flow intensity over which 0.11 kg/h water is atomized by pneumatic atomizer 11.

Water is atomized continuously through pneumatic atomizer 12 with 0.51 kg/h mass flow rate to the surface of grains 15 passing from space element 1 into space element 2, whereas zeolite-bentonite powder mixture of 1.74 kg/h mass flow rate is fed from tank 7 with vibrating feeder 8.

the nearly spherical grains of 1.6 mm size rolling over blocking piece 4 pass from space element 2 into space element 3, where water is injected from atomizer 3 and powder mixture is injected from tank 9 according to arrow c. Mass flow rate of the tank is 1.83 kg/h and that of the powder mixture 8.13 kg/h.

After the continuous and stationary operating mode is set, the end product 18 of mainly (approx. 85 mass%) 2 -3 mm size is discharged from the space element 3 calculating 10 kg/h/dry matter. The wet grains are dried, then activated at 550° C. temperature. Strength of the so-produced adsorbent grains: 14 N; adsorption of steam (in a room of 90 % relative humidity, at 25° C. for 10 days) was 19 mass%.

In the apparatus having the mentioned geometrical dimensions—the speed of which being 40 rpm—a spherical catalyser carrier of 4-6 mm diameter is formed from $Al_2O_3$ powder containing elementary grains of less than 100 $\mu$um grain size.

The nucleus required for continuous and stationary operation is formed in space element 1 of the apparatus (FIG. 4), so that 1 kg/h water of coarse drop size (approx. 0.1 -1 mm) is atomized from atomizer 11 to $Al_2O_3$ powder fed in 1 kg/h mass flow rate from tank 5. Size of the nuclei developed in space element 1 is further increased in space element 2 by the uniform inlet of powder at 3 kg/h mass flow rate to the rolling layer of grains from tank 7 as indicated by arrow b, meanwhile atomizing water of less than 100 $\mu$um drop size at the rate of 0.92 kg/h to the grains by pneumatic atomizer 12. In this case the space element 3 performs compacting after-rolling, where the grains are wetted with atomization of 84 kg/ha water resulting in compacted practically regular spherical grains.

Change of the grain size and relative size distribution of the dried product depending on the time relative to the average time of residence ( $\tau=25$ min. ) is shown in the following Table:

| $t/\tau$ | Grain size (mm) m/m % | | | $\bar{d}$ | $\sigma/\bar{d}$ |
|---|---|---|---|---|---|
| (−) | 3–4 | 4–6 | 6–7 | mm | (−) |
| 1.0 | 1.9 | 82.6 | 15.5 | 5.3 | 0.2 |
| 1.5 | 0 | 62.4 | 37.6 | 5.8 | 0.2 |
| 2.1 | 1.9 | 82.6 | 15.5 | 5.3 | 0.2 |
| 2.7 | 1.0 | 71.7 | 27.3 | 5.4 | 0.1 |
| 3.2 | 9.2 | 69.2 | 21.6 | 5.2 | 0.2 |
| 3.7 | 5.5 | 75.5 | 19.0 | 5.2 | 0.1 |
| 4.6 | 10.9 | 66.3 | 22.7 | 5.2 | 0.2 |
| 5.2 | 11.9 | 65.1 | 23.0 | 5.2 | 0.2 |
| 7.0 | 0.3 | 78.3 | 21.4 | 5.3 | 0.1 |
| 7.6 | 0 | 89.7 | 10.3 | 5.2 | 0.1 | the relative mass of the 4–6 mm grain fraction is 74 mass% on the average, the average grain size of the product 5.3 mm, its relative distribution is less than 0.2 Density: 800 kg/m³; average compressive strength of the grains: 150 N, abrasion hardness: 98–99 mass%.

The favourable effects of the invention are summed up in the following:

as a result that according to the invention, the part processes of grain formation—namely the nucleation, nucleus input, wetting, dispersion of the components, agglomeration, size enlargement surface layering, coating, colouring etc.—are conducted by increasing the segregation according to grain size and shape, preventing the back-mixing in space parts partly or wholly separated from each other, meanwhile sets of grains are kept in intensive rolling state, and the components—solid matter(s) and dispersed wetting (granulating) liquid(s)—are admitted continuously into space elements corresponding to the part processes, in stationary operation, thus the spherical or nearly spherical grains can be produced economically with high productivity, whose size being in the very favourable 1–10 mm diameter range of minimal size distribution, their surface being free from powder, and whose mechanical properties (friability and breaking strength) being also excellent.

Naturally the invention is not restricted to the above described embodiment of the apparatus, but it can be realized in many ways within the protective circle defined by the claim points.

We claim:

1. Apparatus for the production of grains using the rolling layer technique comprising:
    a rotatable container with a circular cross-section which is suitable for receiving grain-forming components, and inlet devices for introducing solid or powdery and liquid materials into said rotatable container, wherein said rotatable container comprises,
    a cylindrical second container section open on both ends thereof
    a first container section adjoined to a lower end of said second section and having a bottom plate disposed at the end farther from said lower end of said second section, said bottom plate having a diameter smaller than the diameter of the seconds section so that a first transfer port is defined between the first and second sections
    a cylindrical third container section adjoined to an upper end of said second section and being open on both ends thereof, said third section having a diameter which is greater than that of the second section and having a second transfer port with a diameter equal to that of said second section disposed between the second and third container sections;

wherein said first, second, and third container sections are concentrically arranged in relation to the geometrical axis of rotation of said rotatable container, and wherein the portion of said third section extending from the periphery of said second section comprises a circular bottom plate having on the inside periphery thereof an annular blocking piece surrounding said second transfer port between said second and third sections the height of said annular blocking piece being smaller than the height of said third section 2. An apparatus according to claim 1, wherein said annular blocking piece has a radial surface, said radial surface having a concave portion on the side facing said second transfer port, a convex portion on the side opposite said second transfer port, and a generally rounded portion joining said concave portion to said convex portion.

3. An apparatus according to claim 1, wherein said annular blocking piece has a triangular cross section, one vertex of which runs along the edge of said second transfer port.

4. An apparatus according to claim 1, wherein said annular blocking piece has a hemisphere or spherical segment cross section.

5. An apparatus according to any one of claims 1, 2, 3, or 4, wherein the maximum height of said annular blocking piece is within the range of about 1 to 10 cm.

6. An apparatus according to any one of claims 1, 2, 3 or 4, wherein the maximum height of said annular blocking piece is within the range of about 2 to 5 cm.

7. An apparatus according to any one of claims 1, 2, 3 or 4, wherein the minimum diameter of said first container section is within the range of about 0.1 to 0.6 times said diameter of said second container section, and wherein said diameter of said third container section is within the range of about 1.2 to 2.0 times said diameter of said second container section.

8. An apparatus according to any one of claims 1, 2, 3 or 4, wherein the minimum diameter of said first container section is about 0.3 times said diameter of said second container selection, and wherein said diameter of said third container section is within the range of about 1.4 to 1.5 times said diameter of said second container section.

9. An apparatus according to any one of claims 1, 2, 3 or 4 or wherein the minimum diameter of said first container section is about 0.3 times said diameter of said second container section, wherein said third container section is within the range of about 1.4 to 1.5 times said diameter of said third container section, wherein the maximum height of said annular blocking piece is within the range of about 2 to 5 cm, and wherein the geometical axis of rotation of said container is within the range of about 20° to 50° above the horizontal.

10. An apparatus according to any one of claims 1, 2, 3 or 4, wherein the height of said first container section and the height of said second container section are each within the range of about 0.1 to 0.3 times said diameter of said second container section, and wherein the height of said third container section is within the range of about 0.1 to 0.3 times said diameter of said third container section.

11. An apparatus according to any one of claims 1, 2, 3 or 4, wherein the height of said first container section and the height of said second container section are each about 0.2 times said diameter of said second container section, and wherein the height of said third container section is about 0.2 times said diameter of said third container section.

12. An apparatus according to any one of claims 1, 2, 3 or 4, wherein the half angular subtense ($\beta$) of said first container section is within the range of 45° to 70°.

13. An apparatus according to any one of claims 1, 2, 3 or 4, wherein the half angular subtense ($\beta$) of said first container section is about 60°.

14. An apparatus according to any one of claims 1, 2, 3 and 4, wherein said inlet devices include a plurality of liquid inlet spray-heads, each of said spray-heads separately introducing liquid to at least two of said first, second, and third container sections, and a plurality of solid matter inlets suitable for introducing various granular or powdery solid matter components to said container.

15. An apparatus according to any one of claims 1, 2, 3 or 4, wherein the geometrical axis of rotation of said container is within the range of about 0° to 50° above the horizontal.

16. An apparatus according to claim 15, wherein the maximum height of said annular blocking piece is within the range of about 2 to 5 cm.

17. An apparatus according to any one of claims 1, 2, 3 or 4, wherein the geometrical axis of rotation of said container is within the range of about 20° to 50° above the horizontal.

18. An apparatus according to claim 17, wherein the maximum height of said annular blocking piece is within the range of about 2 to 5 cm.

19. An apparatus according to any one of claims 1, 2, 3 or 4, further comprising at least one cylindrical additional container section connected with said third container section to define a third transfer port, the diameter of said additional container section being greater than said diameter of said third container section, said additional container section having an annular blocking piece surrounding said third transfer port.

20. An apparatus according to claim 19, wherein said solid matter inlets are supplied said solid matter components from tanks.

* * * * *